United States Patent
Osterholt et al.

(10) Patent No.: US 7,579,952 B2
(45) Date of Patent: Aug. 25, 2009

(54) SYSTEM AND METHOD TO IDENTIFY AND TRACK RFID TAGS

(75) Inventors: Kain Osterholt, Peoria, IL (US); Matthew John Travis, Alexandria, VA (US)

(73) Assignee: Caterpillar Inc., Peoria, IL (US)

( * ) Notice: Subject to any disclaimer, the term of this patent is extended or adjusted under 35 U.S.C. 154(b) by 335 days.

(21) Appl. No.: 11/495,564

(22) Filed: Jul. 31, 2006

(65) Prior Publication Data

US 2008/0061938 A1    Mar. 13, 2008

(51) Int. Cl.
G08B 13/14    (2006.01)
(52) U.S. Cl. ................................... 340/572.1
(58) Field of Classification Search ... 340/572.1–572.9, 340/573.1, 539.1, 10.1, 5.1; 342/451; 700/179
See application file for complete search history.

(56) References Cited

U.S. PATENT DOCUMENTS

| | | | |
|---|---|---|---|
| 3,644,825 A | 2/1972 | Davis, Jr. et al. | |
| 6,061,617 A | 5/2000 | Berger et al. | |
| 6,084,546 A | 7/2000 | Wax et al. | |
| 6,456,239 B1 | 9/2002 | Werb et al. | |
| 6,674,403 B2 | 1/2004 | Gray et al. | |
| 6,700,533 B1 | 3/2004 | Werb et al. | |
| 6,731,209 B2 | 5/2004 | Wadlow et al. | |
| 6,753,782 B2 | 6/2004 | Power | |
| 6,987,971 B2 | 1/2006 | Kirsch | |
| 6,992,625 B1 | 1/2006 | Krumm et al. | |
| 7,242,306 B2 * | 7/2007 | Wildman et al. | 340/573.1 |
| 2003/0125961 A1 | 7/2003 | Janda | |
| 2005/0035862 A1 | 2/2005 | Wildman et al. | |
| 2005/0052287 A1 | 3/2005 | Whitesmith et al. | |
| 2005/0270236 A1 * | 12/2005 | Krumm et al. | 342/451 |

FOREIGN PATENT DOCUMENTS

| | | |
|---|---|---|
| WO | WO 00/19235 | 4/2000 |
| WO | WO 2006/050516 | 5/2006 |

* cited by examiner

*Primary Examiner*—Phung Nguyen
(74) *Attorney, Agent, or Firm*—Finnegan, Henderson, Farabow, Garrett & Dunner

(57) ABSTRACT

A system and method are disclosed that provide device recognition. The system has one or more identification devices and a reading device configured to obtain data from the one or more identification devices. The system also has a receiving device in communication with the reading device. The receiving device is configured to determine a variance value for each of the one or more identification devices based on data received from the reading device and evaluate the determined variance values to identify at least one of the one or more identification devices.

20 Claims, 2 Drawing Sheets

SYSTEM AND METHOD TO IDENTIFY AND TRACK RFID TAGS

TECHNICAL FIELD

The present disclosure relates generally to Radio Frequency Identification (RFID), and more particularly, to systems and methods for identifying and tracking RFID tags.

BACKGROUND

Machines such as integrated tool carriers, skid steer loaders, agricultural tractors, excavators, and other machines have a variety of tools that may be attachable to the machine to perform different tasks. These machines and tools may be controlled through a control system having one or more operator input devices such as, for example, levers, foot pedals, joysticks, and other devices known in the art. Each tool may require different control parameters for the operator input devices to accomplish the different tasks. For example, an operator of a tool carrier having a fork attachment may require precise control over tool movement speed or machine travel speed during a stacking operation, while such precise control may not be required for the same tool carrier having a bucket attachment for performing earth moving operations. In addition, a machine with no tool attached may require precise travel speed control at low travel speeds to facilitate a tool attachment procedure, but less precise travel speed control at higher speeds when the tool is attached and the machine is traveling between jobsites or tool storage locations. These machines may be configured to automatically change control parameters based on an identification of an attached tool.

One method to identify a tool is by means of a Radio Frequency Identification (RFID) system. RFID systems enable data to be transmitted by a identification device, called a tag, which is read by an RFID receiver and processed according to the needs of a particular application. The data transmitted by the tag may provide identification or location information about the tag. Typically, identification is achieved by bringing an RFID transmitter within range of an RFID receiver and reading the information contained on the tag. A tool having an RFID tag attached may be similarly identified when the tool comes within a range of the RFID receiver. However, when multiple tools having RFID tags are within range of the RFID receiver, identification of a particular tool becomes more difficult.

It is known to identify and track a particular RFID tag by comparing signals received from the RFID tag at different times to determine a relative change in distance between the RFID tag and the RFID receiver. One such example is U.S. Patent Publication Number 2005/0052287 (the '287 publication) to Whitesmith et al., which was published on Mar. 10, 2005. The '287 publication discloses a system and method having RFID tags for emitting short bursts of RF energy at periodic intervals. The system also has RFID detectors for receiving signals from the particular RFID tag and control means for comparing the signals received from the particular RFID tag at different times to determine a relative change in distance between the RFID tag and the RFID receiver. In the '287 publication, the RFID detector ascertains certain parameters of the RF signal received from the particular RFID tag including the period of time between pulses of the signal, the length of the pulses, or the amplitude of the pulses. Variations in these parameters are the result of changes in the relative positions of the receiving unit and the particular RFID tag. The change in relative position is indicative of a change in location of either the RFID tag, the RFID detector, or both.

Although the system of the '287 publication may enable the detector to track by sensing a relative change in distance between the particular RFID tag and the RFID detector, the system does not provide a way to identify and track the RFID tag based on the variance in the received parameters. Thus, when multiple tags are in use in the system of the '287 publication, the system cannot identify and track a particular RFID tag based on the motion of the tag.

The disclosed system is directed to overcoming one or more of the problems set forth above.

SUMMARY OF THE INVENTION

In one aspect, the present disclosure is directed to a system that provides device recognition. The system includes one or more identification devices and a reading device configured to obtain data from the one or more identification devices. The system also has a receiving device in communication with the reading device. The receiving device is configured to determine a variance value for each of the one or more identification devices based on data received from the reading device and evaluate the determined variance values to identify at least one of the one or more identification devices.

In another aspect, the present disclosure is directed to a method for identifying and tracking identification devices. The method includes obtaining a plurality of data samples from each of one or more identification devices and determining a variance value for each of the one or more identification devices using the plurality of samples. The method further includes evaluating the determined variance values to identify at least one of the one or more identification devices.

In another aspect, the present disclosure is directed to a device recognition system. The system includes a machine, one or more tools removably attachable to the machine, and at least one identification device associated with each of the one or more tools. The system further includes a computing system configured to obtain a plurality of data samples from the at least one identification device and determine a variance value for each of the identification devices using the plurality of data samples. The computing system is further configured to evaluate the determined variance values to identify at least one of the one or more identification devices and control parameters of the machine based on the identification of the at least one or more identification devices.

DETAILED DESCRIPTION

Figure 1:
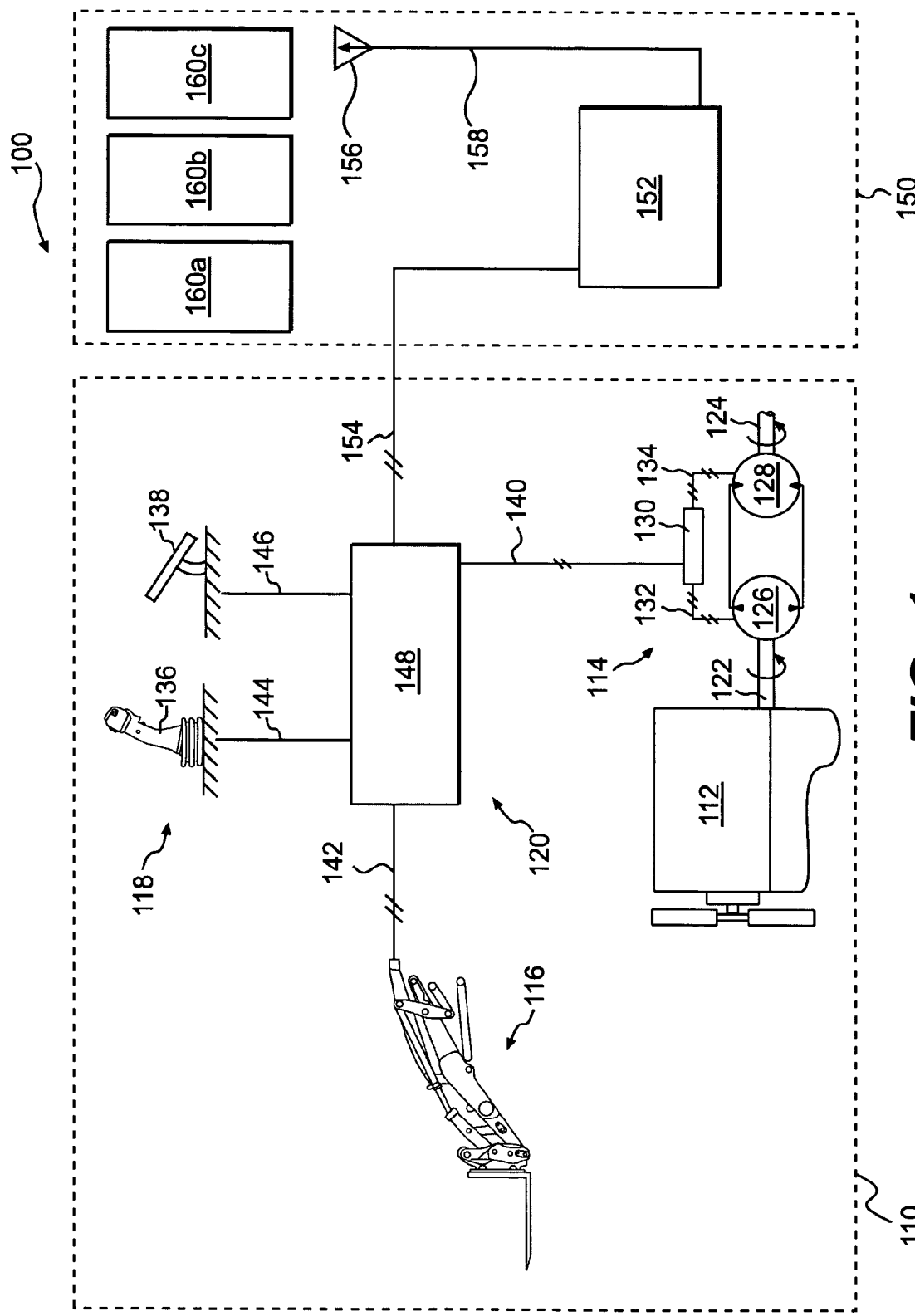
FIG. 1 is a diagrammatic representation of an exemplary disclosed identification and tracking system.

FIG. 1 illustrates an exemplary device recognition system 100. Device recognition system 100 may include a machine 110 and an identification system 150. Machine 110 may be a fixed or mobile machine that performs some type of operation associated with an industry such as mining, construction, farming, or any other industry known in the art. For example, machine 110 may be a material handler, a backhoe, an integrated tool carrier, a loader, or any other machine known in the art. Machine 110 may include a power source 112, a transmission 114, a tool 116 removably attachable to machine 110, an operator interface 118, and a control system 120.

Power source 112 may include an internal combustion engine such as, for example, a diesel engine, a gasoline engine, a natural gas engine, or any other engine apparent to one skilled in the art. Power source 112 may, alternatively, include another source of power such as a furnace, a battery, a fuel cell, a motor, or any other appropriate source of power.

Transmission 114 may transmit power from power source 112 to an output device (not shown) at a range of output speed ratios. Transmission 114 may be a hydraulic transmission, a mechanical transmission, a hydro-mechanical transmission, an electric transmission, or any other suitable transmission. The output device may include a ground engaging device such as, for example, wheels, tracks, belts, or any other ground engaging device known in the art. An input drive member such as, for example, a countershaft 122, may connect power source 112 to transmission 114. Transmission 114 may also include an output driven member such as, for example, an output shaft 124 connecting transmission 114 to the output device. In this manner, power generated by power source 112 may be transmitted through output shaft 124 to the output device. It is contemplated that transmission 114 may alternatively transmit power from power source 112 to the output device at only a single output speed ratio.

In an exemplary embodiment, transmission 114 may be a hydraulic transmission having a pump 126 and a motor 128. Pump 126 and motor 128 may be variable displacement, variable delivery, fixed displacement, or any other configuration known in the art. Pump 126 may be directly connected to power source 112 via countershaft 122. Alternatively, pump 126 may be connected to power source 112 via a torque converter, a gear box, or in any other manner known in the art. Motor 128 may be fluidly connected to the pump 126 by conduits that supply and return fluid to and from the pump 126 and motor 128, allowing pump 126 to effectively drive motor 128 by fluid pressure. Motor 128 may be directly connected to the output device via output shaft 124. Machine 110 may or may not include a reduction gear arrangement such as, for example, a planetary arrangement disposed between motor 128 and the output device.

A transmission controller 130 may be in communication with pump 126 and motor 128 via control lines 132 and 134, respectively, and may change displacements of pump 126 and/or motor 128 in response to a desired travel speed of machine 110 to thereby control the output rotation of output shaft 124. Control lines 132 and 134 may be digital, analog, or mixed types of communication lines. Alternatively, communication between with the various components of transmission 114 may be implemented by means of mechanical or hydraulic lines.

Numerous different tools may be attachable to a single machine and controllable via operator interface 118. Tool 116 may include any device used to perform a particular task. For example, tool 116 may include a fork arrangement, a blade, a bucket, a shovel, a ripper, a dump bed, a broom, a snow blower, a propelling device, a cutting device, a grasping device, or any other task-performing device known in the art. Tool 116 may be connected to machine 110 via a direct pivot, via a linkage system, via one or more hydraulic cylinders, or in any other appropriate manner. Tool 116 may be configured to pivot, rotate, slide, swing, lift, or move relative to machine 110 in any manner known in the art.

Operator interface 118 may be located within an operator cabin of machine 110, in close proximity to a seat (not shown), and may include numerous devices to control the components, features, and functions of machine 110. In one example, operator interface 118 may include a joystick controller 136 and a foot pedal 138. It is contemplated that operator interface 118 may include additional or different control devices such as, for example, levers, switches, buttons, pedals, wheels, and other control devices known in the art.

Joystick controller 136 may be configured to control a movement of tool 116. In particular, joystick controller 136 may be tiltable about at least one axis and may control travel speed proportionally. For example, joystick controller 136 may be tiltable in a forward position relative to a machine operator to cause movement of tool 116 in a first direction. Joystick controller 136 may also be tiltable in a rearward position relative to the machine operator to cause movement of tool 116 in a second direction opposite to the first direction. Joystick controller 136 may have a maximum and a minimum tilt angle limit in both the forward and rearward directions and may be tiltable to any angle between the maximum and minimum positions to move tool 116 at a corresponding speed between a maximum and minimum travel speed in the associated direction. The ratio of the percent of maximum travel speed to the percent of maximum tilt angle of joystick controller 136 may be considered a tool movement speed gain. It is contemplated that joystick controller 136 may be tiltable about multiple axis, twistable, and/or movable in any other manner. It is further contemplated that joystick controller 136 may be configured to control additional machine functions other than movement of tool 116. It is also contemplated that the movement of tool 116 may be controlled by a control device other than joystick controller 136 such as, for example, a slide mechanism, a wheel mechanism, a pedal, or any other appropriate device. In addition, it is contemplated that the movement of tool 116 may be non-proportional to the control provided by joystick controller 135 or other control device.

Foot pedal 138 may be configured to control a travel speed and/or rimpull torque of machine 110. In particular, a travel speed and/or rimpull torque of machine 110 may be proportional to an actuation position of foot pedal 138. For example, foot pedal 138 may be pivotal in a first direction to indicate a desired increase in travel speed and/or rimpull torque of machine 110. Foot pedal 138 may also be pivotal in a second direction opposite the first direction to indicate a desired decrease in travel speed and/or rimpull torque of machine 110. Foot pedal 138 may have a maximum pivot limit in the first direction and a minimum pivot limit in the second direction and may be pivotal to any position between the maximum and minimum positions to set a desired travel speed and/or rimpull torque of machine 110 at a corresponding speed between a maximum and minimum travel speed and/or rimpull torque. The ratio of a percent of maximum travel speed to a percent of maximum pivot angle of foot pedal 138 may be considered a machine travel speed gain. The ratio of a percent of maximum rimpull torque to a percent of maximum pivot angle of foot pedal 138 may be considered a machine rimpull torque gain. It is contemplated that the travel speed and/or rimpull torque of machine 110 may be controlled by a control device other than foot pedal 138 such as for example, a slide mechanism, a wheel mechanism, a joystick, or any other appropriate device.

Control system 120 may be in communication with transmission controller 130 of transmission 114 via a communication line 140, with tool 116 via a communication line 142, with joystick controller 136 via a communication line 144, and with foot pedal 138 via a communication line 146. Communication lines 140-146 may be digital, analog, or mixed types of communication lines. Control system 120 may include a control module 148.

Control module 148 may be configured to change an operation of machine 110 in response to a signal received from identification system 150. In particular, control module 148 may change a tool movement speed gain, a machine travel speed gain, and/or a machine rimpull gain. For example, when a first tool 116 is attached to machine 110, control module 148 may implement a first tool movement speed gain, machine travel speed gain, or machine rimpull gain, and implement a second tool movement speed gain, machine travel speed gain, or machine rimpull gain when a second tool 116 is attached to machine 110. It is contemplated that a third tool movement speed gain, machine travel speed gain, or machine rimpull gain may be implemented when no tool 116 is attached to machine 110. Based upon an identification of an attached tool, control module 148 may change other parameters such as, for example, hydraulic flow rates, power supply levels, velocity limits, force limits, acceleration limits, and the like. For example, one type of tool (i.e., a fork) may require a first pressure and may operate between a first set of limits whereas a second type of tool (i.e., a bucket) may require a higher pressure and may operate between a second set of limits. In addition, it is anticipated that control module 148 may update internal operating tables, databases, and/or other data values based on signals and data received from identification system 150. The updated tables, databases, and/or data values may, in turn, affect engine operation parameters such as, for example, engine flow rates and calculations.

Control module 148 may be a microprocessor that includes a means for storing and comparing information, and for controlling an operation of power source 112. Control module 148 may be embodied in a single microprocessor or multiple microprocessors. Numerous commercially available microprocessors can be configured to perform the functions of control module 148. It should be appreciated that control module 148 could readily be embodied in a general machine microprocessor capable of controlling numerous machine functions. Control module 148 may include any means for storing, comparing, and controlling such as a memory, one or more data storage devices, or any other components that may be used to run an application. Alternatively and/or additionally, control module 148 may include one or more software components such as, for example, a computer-readable medium including computer-executable instructions for performing the disclosed method. Furthermore, although aspects of the present disclosure may be generally described as being stored in memory, one skilled in the art will appreciate that these aspects can be stored on or read from types of computer-related products or computer-readable media such as computer chips and secondary storage devices, including hard disks, floppy disks, optical media, CD-ROM, or other forms of RAM or ROM. Various other known circuits may be associated with control module 148, including power supply circuitry, signal-conditioning circuitry, solenoid driver circuitry, communication circuitry, and other appropriate circuitry. It is contemplated that one or more of the hardware components listed above may be implemented using software such as, for example, memory may include a software partition associated with one or more other hardware components of control module 148.

Control module 148 may be in communication via a communication line 154 with identification system 150. Communication line 154 may be wired and/or wireless and may be digital, analog, or a mixed type of communication line.

Identification system 150 may include a receiving device 152, a reader 156, and one or more identification devices 160*a*-*c*. Receiving device 152 may include one or more processors (not shown) and may interface with other computers or computing devices, such as control module 148. Receiving device 152 may include any means for storing, comparing, and controlling data, such as a memory, one or more data storage devices, or any other components that may be used to run an application. Furthermore, although aspects of the present disclosure may be generally described as being stored in memory, one skilled in the art will appreciate that these aspects can be stored on or read from types of computer-related products or computer-readable media such as computer chips and secondary storage devices, including hard disks, floppy disks, optical media, CD-ROM, or other forms of RAM or ROM. Various other known circuits may be associated with receiving device 152, including power supply circuitry, signal-conditioning circuitry, solenoid driver circuitry, communication circuitry, and other appropriate circuitry. It is contemplated that one or more of the hardware components listed above may be implemented using software such as, for example, memory may include a software partition associated with one or more other hardware components of receiving device 152. In some embodiments, all or part of the functionality of receiving device 152 may be shared with, or embedded on, control module 148.

Reader 156 may send and/or receive signals, such as, for example, digital signals, analog signals, speech signals, audio signals, image signals, optical signals, etc. In one embodiment, reader 156 may include an input/output antenna and may be configured to send and receive RFID signals to/from identification devices 160. Additionally, reader 156 may be in communication with receiving device 152 via communication line 158. Communication line 158 may be wired and/or wireless.

Identification devices 160 may be configured to detect an activation signal sent from the reader 156 and may respond to the signal when one or more of identification devices 160 are within a range of reader 156. Identification devices 160 may each include an antenna to send and/or receive signals and/or other data. Identification devices 160 may also include one or more memory regions for storing data, such as, for example, an identification number/code, power level, signal strength, etc. In some embodiments, identification devices 160 may include one or more sensors to monitor environmental conditions such as temperature, humidity, shock/vibration, light, and radiation. Identification devices 160 may move, or be capable of moving, in relation to one or more other items and/or identification devices 160 may move, or be capable of moving, independently of one or more other items. In addition, identification devices 160 may be attachable and/or detachable, either permanently, semi-permanently, or temporarily, to one or more other items. Alternatively, identification devices 160 may be integrated with one or more other items and the one or more other items may move or be capable of moving. Identification devices 160 may be, for example, radio frequency identification tags, infrared sensors, or the like. In some embodiments, identification devices 160 may be attached to tools 116.

INDUSTRIAL APPLICABILITY

The present system and method may be used in any environment where it is desirable to the track the movement of objects by evaluating variations in data, such as signal strength, temperature, humidity, shock/vibration, light, radiation, and the like, provided by an identification device attached to or otherwise connected with the object. When multiple identification devices are within range of receiver or reader, the ability to evaluate variations in data may provide for an increased ability to precisely identify one identification device among a number of identification devices. The operation of the system and method for tracking moving RFID tags will now be discussed.

Figure 2:
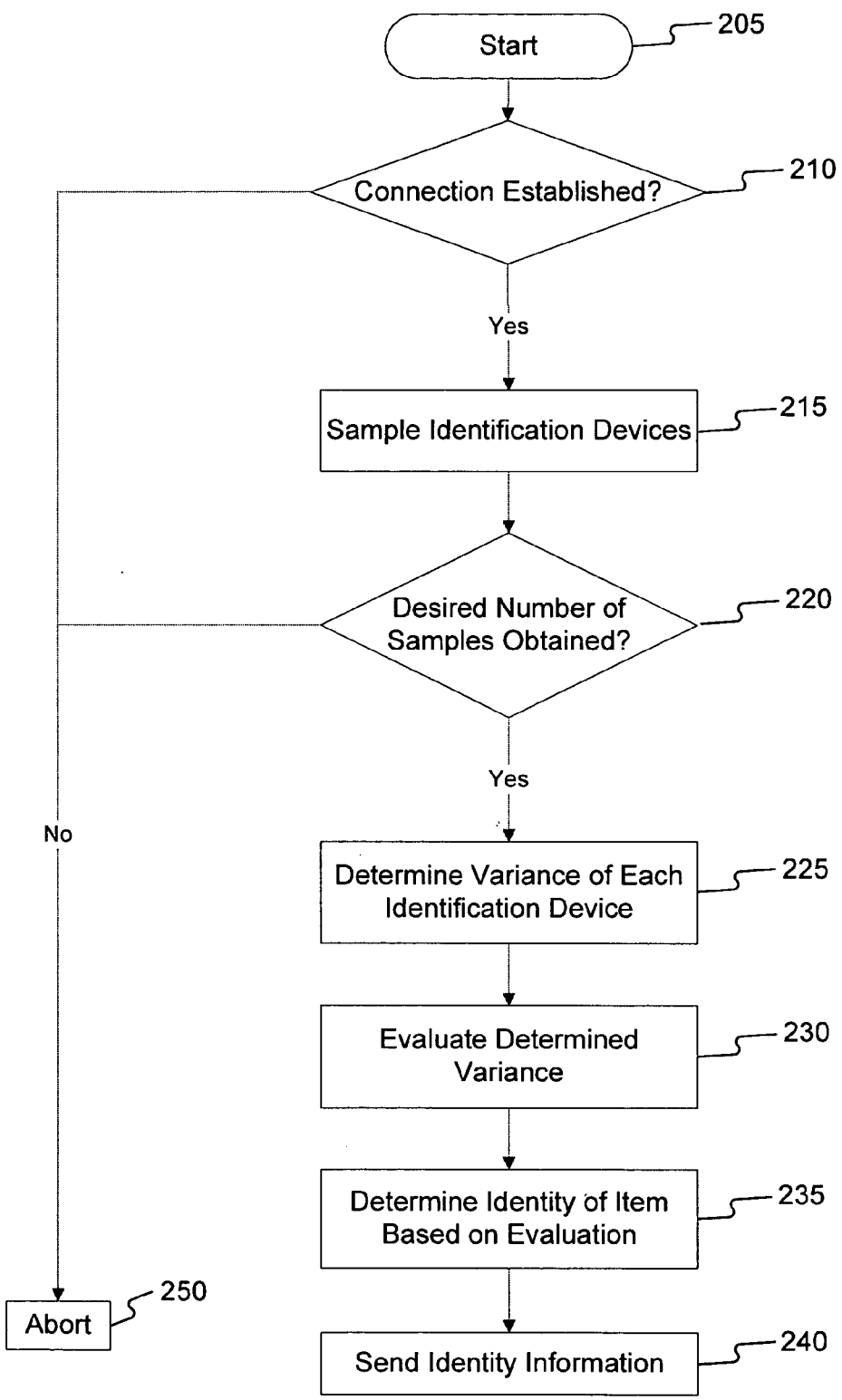
FIG. 2 is a flow chart illustrating an exemplary disclosed method of operating the system of FIG. 1.

Referring to FIG. 2, the disclosed method may be initiated either automatically or manually. For example, the process may begin at step 205 when a signal is received by identification system 150. The signal may be received from control module 148 or may be received from a user through a user-interface (not shown). Alternatively and/or additionally, the request may be automatically initiated when certain criteria are met, such as, for example, a system event, a change in expected parameters, a completion of a predetermined series of events, and the like.

Once the identification system 150 receives a signal to begin the process, receiving device 152 may attempt to establish a connection with reader 156 (step 210). The connection may be established through any means known in the art, such as for example, a wireless connection and the attendant protocols, a wired connection, or any combination thereof. If the receiving device 152 is unable to establish a connection with reader 156, the process may abort (step 210, No). If the process aborts (step 250) without completing and/or identifying one or more identification devices 160, a user may be allowed to manually enter identification information related to the item with which the identification devices 160 are associated. For example, if identification device 160a is attached to a fork, the user may enter information to identify the fork. The information may be a general descriptor (e.g., fork, blade, bucket, shovel, etc.) or may be a series of letters, numbers, and/or symbols that uniquely identify the item. Alternatively and/or additionally, the process may begin again at step 205.

If a connection to the reader 156 is successfully established (step 210, Yes), the reader 156 may begin sampling identification devices 160 (step 215). Reader 156 may perform a complete sampling scan of identification devices 160 (e.g., as many as possible), a quick scan, and/or scan for specific tag types. Sampling may include sending and/or receiving data signals to/from identification devices 160 within a read range of reader 156 for a specified period of time. The data signals may include information for each of the identification devices 160, such as, for example, a unique identification number, signal power level, battery life, etc. In some embodiments, data signals may also include information such as, for example, temperature, humidity, shock/vibration, light, radiation, etc. A read range is the range in which reader 156 can exchange signals with identification devices 160. The period of time may be determined based on a set of conditions, may be entered by a user, or may be pre-determined. As an example, receiving device 152 may send a signal to reader 156 to initiate collection of ten samples over a five second period of time from all identification devices 160 within the read range of reader 156. In this example, only identification devices 160a and 160b may be within a read range of reader 156. Thus, only identification devices 160a and 160b may respond with, for example, an identification number, a power level, and a value related to the remaining battery life.

Once the sampling of identification devices 160 is complete, the number of received samples may be checked to determine if a desired number of samples has been obtained (step 220). If a desired number of samples has not been obtained (step 220, No), processing may abort as discussed above with respect to step 250. The desired number of samples may be a predetermined number of samples designed to provide a level of precision in the calculation of variance.

If a desired number of samples is reached (step 220, Yes), a variance for each one of sampled identification devices 160 may be calculated (step 225) by receiving device 152. The variance may be, for example, a measure of the statistical dispersion of the sampled signals or the deviation from an average. To determine the variance of each one of the identification devices 160 (step 225), the mean, or average, value may be calculated using the following equation:

$$\overline{X} = \frac{1}{N}\sum_{n=1}^{N}(X[n]) \quad \text{Eq. 1}$$

wherein:
  $\overline{X}$ is the Mean Average Value;
  N is the Number of Samples; and
  X[n] is the Sample Value at n.

In some embodiments, to determine the mean average value, it may be desirable to use a time-averaging function according to the following equation:

$$\overline{X} = \frac{1}{T}\int_{0}^{T} X(t)d(t) \quad \text{Eq. 2}$$

wherein:
  $\overline{X}$ is the Mean Average Value;
  T is the Total Time; and
  X[t] is the Sample Value at t.

In either case, a variance may be determined using the determined mean average value according to the following equation:

$$\sigma^2 = \overline{(X^2)} - (\overline{X})^2 \quad \text{Eq. 3}$$

wherein:
  $\sigma^2$ is the Variance; and
  $\overline{X}$ is the Mean Average Value.

Once a variance value for each of the one or more identification devices 160 within a read range of reader 156 has been calculated, the one or more calculated variance values are evaluated (step 230). The evaluation may include determining if there is more than one identification device 160 with a variance meeting and/or exceeding a threshold. For example, samples of the signal power level may be received from identification devices 160a, 160b, and 160c and a variance of the signal power level for each identification device 160 may be calculated. If the calculated variance for one identification device 160 (i.e., identification device 160a) exceeds a predetermined threshold value, it may be determined that identification device 160a is moving. The predetermined threshold value may be any suitable value not equal to zero. In some embodiments, it is envisioned that the evaluation of the calculated variance may include evaluation of a variance pattern or, alternatively, may be a determination of a specific number of identification devices 160 having variance levels above a threshold. For example, a period of high variance followed by a period of low variance may be an expected variance pattern for a specific tool type (e.g., bucket, loader, etc.) or two identification devices 160 that may both have variances above a threshold may be indicative of a grasping device.

The identity of an item may be determined (step 235) by accessing, for example, a database or table containing entries associating identification devices 160 with specific items (e.g., identification device 160a may be associated with a fork, identification device 160b may be associated with a bucket, and identification device 160c may be associated with a loader). Unique identification codes and/or numbers associated with identification devices 160 may be used as indexes into the database or table. For example, using the unique identification code associated with identification device 160a as an index into the database may return data identifying a fork as the item to which identification device 160a may be attached. The determined identity of the item associated with one or more identification devices 160 may be sent to control module 148 (step 240).

Referring again to FIG. 1, when control system 120 is in operation, the attachment of a particular tool 116 may be recognized automatically by identification system 150, which generates a signal unique to that tool 116. The unique signal from the identification system 150 may then be directed to control module 148.

Control module 148 may receive the signal generated by the identification system 150 and may change a machine travel speed gain, a machine rimpull torque gain, and/or a tool movement speed gain, which may result in a sensitivity change to operator input through joystick controller 136 and/or foot pedal 138. For example, a gain value of 1 means that when either joystick controller 136 or foot pedal 138 is actuated to a position of 50% of maximum, the speed of tool movement, the speed of machine travel, and/or the machine rimpull torque will be 50% of a maximum. If the gain value is changed to be greater than 1 for a portion of the speed gain curve, actuating either joystick controller 136 or foot pedal 138 through 50% of its movement range may result in a speed and/or torque change greater than 50% of the speed and/or torque range. Similarly, if the gain value is changed to be less than 1, actuating either joystick controller 136 or foot pedal 138 through 50% of its movement range may result in a speed and/or torque change of less than 50% of the speed and/or torque range. In this manner, increasing a gain value may increase sensitivity of tool 116 or machine 110 to operator input through either joystick controller 136 or foot pedal 138. Increased sensitivity may provide for a machine that is very responsive, while requiring little operator movement. Decreasing a gain value may decrease sensitivity of tool 116 or machine 110 to operator input through either joystick controller 136 or foot pedal 138. Decreased sensitivity of tool movement or machine travel to operator input may allow for more precise placement of tool 116 or machine 110.

Similarly, control module 148 may receive a signal generated by the identification system 150 and may change other machine parameters based on the signal and/or data provided by identification devices 160. For example, hydraulic flow rates may change based upon identification of a particular tool 116 attached to machine 110. Alternatively and/or additionally, based on data received from identification devices 160, control module 148 may change power supply, velocity limits, force limits, acceleration limits, etc. In some embodiments, it is anticipated that control module 148 may update internal operating tables based on data received from identification devices 160. For example, the data associated with engine flow rates may change based upon data provided by external ambient pressure sensors associated with identification devices 160.

It will be apparent to those skilled in the art that various modifications and variations can be made in the price stabilization method without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A method for identifying and tracking identification devices, comprising:
   obtaining a plurality of data samples from one or more identification devices;
   determining a variance value for each of the one or more identification devices using the plurality of samples; and
   evaluating the determined variance values to identify at least one of the one or more identification devices.

2. The method as in claim 1, wherein determining a variance value for each of the one of more identification devices includes determining a deviation from an average.

3. The method as in claim 1, wherein evaluating the determined variance values includes determining the identification device having the highest variance value.

4. The method as in claim 1, wherein evaluating the determined variance values includes:
   comparing each of the determined variance values with a threshold; and
   determining at least one of the one or more identification devices having a variance value exceeding the threshold.

5. The method as in claim 1, wherein each of the one or more identification devices is associated with an object, the method further including determining the identity of at least one object based on the identification of the at least one of the one or more identification devices.

6. The method as in claim 5, wherein the identified object is attached to a machine, the method further including controlling one or more parameters of the machine based on the determined identity of the object.

7. The method as in claim 1, wherein the plurality of data samples includes data from one or more sensors associated with the identification devices, the method further including determining a movement of at least one of the one or more identification devices based on data received from the one or more identification devices.

8. The method as in claim 1, wherein the one or more identification devices are radio frequency identification (RFID) devices.

9. A device recognition system, comprising:
   one or more identification devices;
   a reading device configured to obtain data from the one or more identification devices; and
   a receiving device in communication with the reading device and configured to determine a variance value for each of the one or more identification devices based on data received from the reading device and evaluate the determined variance values to identify at least one of the one or more identification devices.

10. The system of claim 9, wherein determining a variance value for each of the one of more identification devices includes determining a deviation from an average.

11. The system of claim 9, wherein evaluating the determined variance values includes determining the identification device having the highest variance value.

12. The system of claim 9, wherein evaluating the determined variance values includes:
   comparing each of the determined variance values with a threshold; and
   determining at least one identification device having a variance value exceeding the threshold.

13. The system of claim 9, wherein each of the one or more identification devices is associated with an object, the system further including determining the identity of at least one object based on the identification of the at least one of the one or more identification devices.

14. The system of claim 13, wherein the identified object is attached to a machine, the system further including controlling one or more parameters of the machine based on the determined identity of the object.

15. The system of claim 9, wherein the plurality of data samples includes data from one or more sensors associated with the identification devices, the system further including determining a movement of at least one of the one or more identification devices based on data received from the one or more identification devices.

16. The system of claim 9, wherein the one or more identification devices are radio frequency identification (RFID) devices.

17. A device recognition system, comprising:
   a machine;
   one or more tools removably attachable to the machine;
   at least one identification device associated with each of the one or more tools; and
   a computing system configured to obtain a plurality of data samples from the at least one identification device, determine a variance value for each of the identification devices using the plurality of data samples, evaluate the determined variance values to identify at least one of the one or more identification devices, and control parameters of the machine based on the identification of the at least one or more identification devices.

18. The system of claim 17, wherein the plurality of data samples includes data from one or more sensors associated with the identification devices, the system further including determining a movement of at least one of the one or more identification devices based on data received from the one or more identification devices.

19. The system of claim 17, wherein evaluating the determined variance values includes:
   comparing each of the determined variance values with a threshold; and
   determining at least one identification device having a variance value exceeding the threshold.

20. The system of claim 17, wherein the one or more identification devices are radio frequency identification (RFID) devices.

* * * * *